(12) United States Patent
Kenyon

(10) Patent No.: US 6,932,341 B1
(45) Date of Patent: Aug. 23, 2005

(54) VIDEO GAME SYSTEM AUXILIARY COVER SYSTEM

(76) Inventor: Kenneth G. Kenyon, 11090 5th Ave., Hesperia, CA (US) 92345

( * ) Notice: Subject to any disclaimer, the term of this patent is extended or adjusted under 35 U.S.C. 154(b) by 0 days.

(21) Appl. No.: 10/784,103

(22) Filed: Feb. 23, 2004

(51) Int. Cl.[7] .............................................. A63F 13/00
(52) U.S. Cl. ............................................... 273/148 B
(58) Field of Search ...................... 273/148 B; 463/46, 463/47; D21/332, 333, 324; 206/320, 307; D14/308, 349, 440, 441, 447, 454

(56) References Cited

U.S. PATENT DOCUMENTS

| | | | |
|---|---|---|---|
| 4,394,055 A * | 7/1983 | Smith ......................... 312/196 |
| 5,324,036 A * | 6/1994 | Morrow ....................... 463/47 |
| 5,375,708 A | 12/1994 | Wittman | |
| 5,888,134 A * | 3/1999 | McNair, Jr. .................. 454/184 |
| 5,899,327 A | 5/1999 | Sykes | |
| 6,068,257 A * | 5/2000 | Orfield .................... 273/148 B |
| 6,120,025 A * | 9/2000 | Hughes, IV ............ 273/148 B |
| D432,586 S * | 10/2000 | Galli-Zugaro et al. ..... D21/333 |
| 6,193,609 B1 * | 2/2001 | D'Achard Van Enschut . 463/37 |
| D473,561 S * | 4/2003 | Skandalis et al. .......... D14/441 |
| D479,530 S * | 9/2003 | Waters ....................... D14/440 |
| 2002/0088726 A1 * | 7/2002 | Chou ......................... 206/320 |
| 2003/0130043 A1 * | 7/2003 | Blake ......................... 463/46 |
| 2004/0058733 A1 * | 3/2004 | Hussaini et al. .............. 463/47 |

* cited by examiner

*Primary Examiner*—Raleigh W. Chiu
(74) *Attorney, Agent, or Firm*—John D. Gugliotta

(57) ABSTRACT

A system by which interchangeable covers are provided for video game consoles and controllers to provide a wide variety of appearances is disclosed. It is envisioned that the system would be customized to work with popular video game consoles. To change the appearance of an existing console, the user would simply snap the new cover over or on the existing manufacturer's cover. The cover would be specifically designed to accommodate all access panels, buttons, cooling vents, connection ports and the like. The new covers would be specifically designed to go with a specific game or be of a more generally styled theme. The game controller covers are two halves that snap around the controller yet expose all control buttons and surfaces. It is also envisioned that an LED lighting system could be embedded in the controller case cover to add an interesting artistic touch by way of case illumination.

10 Claims, 3 Drawing Sheets

VIDEO GAME SYSTEM AUXILIARY COVER SYSTEM

RELATED APPLICATIONS

The present invention was first described in Disclosure Document Number 541,499 filed on Oct. 6, 2003 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to cover systems, and, more particularly, to a video game system auxiliary cover system.

2. Description of the Related Art

Home video game systems are more popular then ever. Modern technological advancements in gaming systems have resulted in literally hundreds of games with unprecedented depth and detail. It is in the not-too-distant future that one could envision the home video game system as a standard item in almost every American home in much the same manner as a television or computer is. As these numbers continue to increase, the market for gaming accessories is growing as well. While most of the accessories are replacement items such as cables and controllers, the need for items that customize the appearance of the console and controllers is sure to grow as well. The market for custom face plates for wireless phones, and custom cases for computers is evidence of this fact.

A search of the prior art did not disclose any patents that read directly on the claims of the instant invention; however, the following references were considered related:

U.S. Pat. No. 5,899,327 discloses a protective storage case for digital discs, computer game cartridges and the like.

U.S. Pat. No. 4,466,674 discloses a home video game storage unit.

U.S. Pat. No. 6,241,247 discloses a remote control with ventilation holes.

U.S. Pat. No. 5,375,708 discloses a reusable hard clear package for video games.

Consequently, there is a need for a means by which video game consoles and controllers can be customized to suite the user's own personal tastes and preferences.

SUMMARY OF THE INVENTION

It is therefore an object of the present invention to provide an improved cover system.

It is a feature of the present invention to provide an improved video game system auxiliary cover system.

Briefly described according to one embodiment of the present invention, a system and method by which interchangeable covers are provided for video game machines and controllers to provide a wide variety of appearances is disclosed. It is envisioned that the system would be customized to work with the X-Box®, PlayStation® consoles, Ninetendo Gamecube® and others. To change the appearance of an existing console, the user would simply snap the new cover over or on the existing manufacturer's cover. The cover would be specifically designed to accommodate all access panels, buttons, cooling vents, connection ports and the like. The new covers would be specifically designed to go with a specific game or be of a more generally natured theme such as flames, psychedelic, rainbow design, children design, sports design and the like. Such specific decorations would be provided by stickers, holographic images, or direct printing methods. The same philosophy would also apply to the controllers which would allow two halves to snap around the controller yet expose all control buttons and surfaces. It is also envisioned that an LED lighting system could be embedded in the console and/or controller case cover to add an interesting artistic touch by way of case illumination. The illumination system would use a single light source or multiple light sources that would be distributed throughout the case by way of fiberoptic strands or cables.

An advantage of the present invention is that it provides a new appearance for video game consoles and controllers in a manner which is not only quick, easy and effective, but eye-catching and unique as well.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
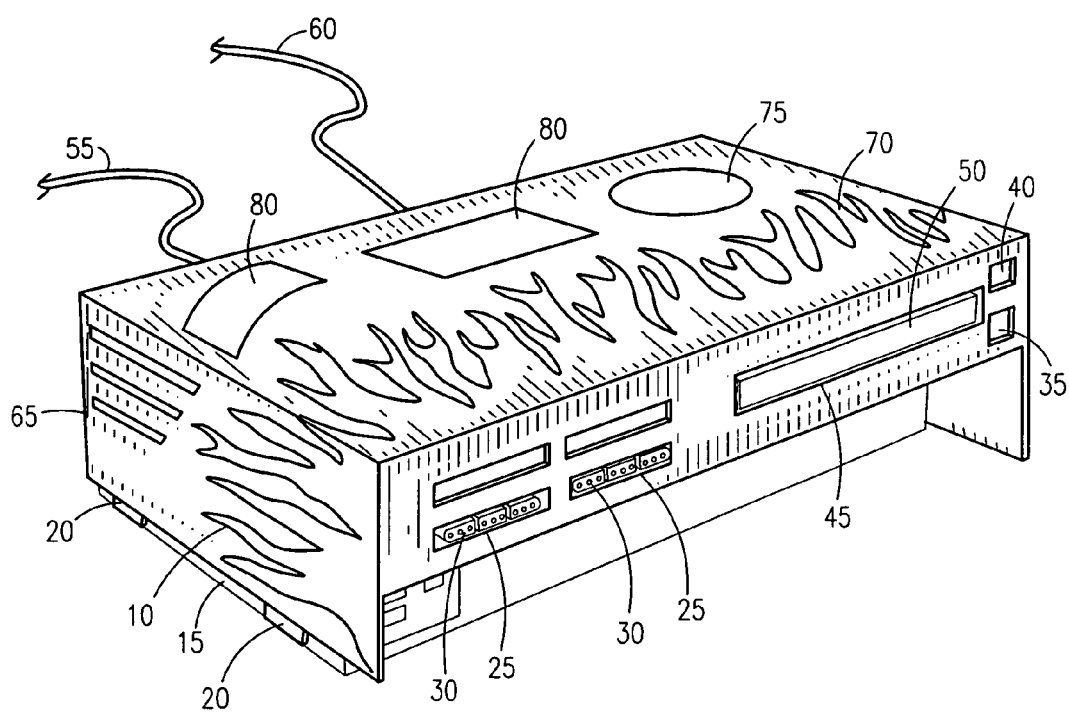
FIG. 1 is an overall pictorial representation of the video game system auxiliary cover system 10, shown in an utilized state upon a video game console 15, according to a preferred embodiment of the present invention.

10 video game system auxiliary cover system
15 video game console
20 first snap clips
25 connector openings
30 connectors
35 switch openings
40 switches
45 media tray opening
50 media tray
55 power cable
60 monitor cable
65 vent openings
70 first graphic displays
75 furnished graphic images
80 user supplied images
85 blank space area
90 fiber optic strands
95 display points
100 power pigtail cable
105 pass through power connector
110 light emitting diode (LED)
115 game controller cover system
120 game controller
125 game controller top half
130 game controller bottom half
135 joysticks
140 pushbuttons
145 paddle switches 150 openings
155 second snap clips
160 receiving clips
165 second graphic displays

DESCRIPTION OF THE PREFERRED EMBODIMENTS

The best mode for carrying out the invention is presented in terms of its preferred embodiment, herein depicted within the FIGS. 1 through 4.

1. Detailed Description of the Figures

Referring now to FIG. 1, an overall pictorial representation of the video game system auxiliary cover system 10 shown in an utilized state upon a video game console 15 is depicted, according the preferred embodiment of the present invention. The video game system auxiliary cover system 10 is an overall cover which encapsulates the video game console 15 on multiple sides. The video game console 15 is depicted as a generic game console for the purposes of illustration. It is envisioned that specifically designed models of the video game system auxiliary cover system 10 would be produced for all past, current and future home video gaming consoles, including systems 10 for X-Box®, PlayStation® consoles, Ninetendo Gamecube® and others. The dimensions and associated tolerances are such that the video game system auxiliary cover system 10 would be held in place on the video game console 15 via friction fit along with the aid of first snap clips 20, which grip the bottom corners and side surface of the video game console 15. Two of four first snap clips 20 are visible in this view for purposes of clarity. The number and placement of the first snap clips 20 would vary dependent on the shape of the video game console 15 and as such is not intended to be a limiting factor of the present invention. A pair of connector openings 25 are provided on the front of the video game system auxiliary cover system 10 to allow access to connectors 30, such as those provided for game controllers. In a similar manner, a pair of switch openings 35 provides access to a set of switches 40, such as those provided for power or ejecting of the gaming media. Finally, also located on the front of the video game system auxiliary cover system 10, is a media tray opening 45 which allows access to a media tray 50, such as those for a compact disc (CD), digital versatile disc (DVD) or other proprietary media. In a similar manner, although not visible in this view, are openings for a power cable 55 which provides electrical power into the video game console 15 and a monitor cable 60 which provides video and audio signals to a monitor system. A set of multiple vent openings 65 are provided on the side of the video game system auxiliary cover system 10 or at any location vents are provided by the manufacturer of the video game console 15. In this manner, it is ensured that any heat producing components located inside of the video game console 15 can be allowed access to outside ambient air. First graphic displays 70 are provided on the top surface of the video game system auxiliary cover system 10, in this case a graphic representation of flames is provided. The first graphic displays 70 can be virtually anything and is envisioned to be related to specific games played on the video game console 15, sport teams, children's themes, adult themes, fantasy themes, and the like. Additional furnished graphic images 75 such as holographic images, photographic images and the like may also be furnished. Finally, user supplied images 80 such as stickers and the like can be added to blank space area 85 furnished on the top of the video game system auxiliary cover system 10 by the final user.

Figure 2:
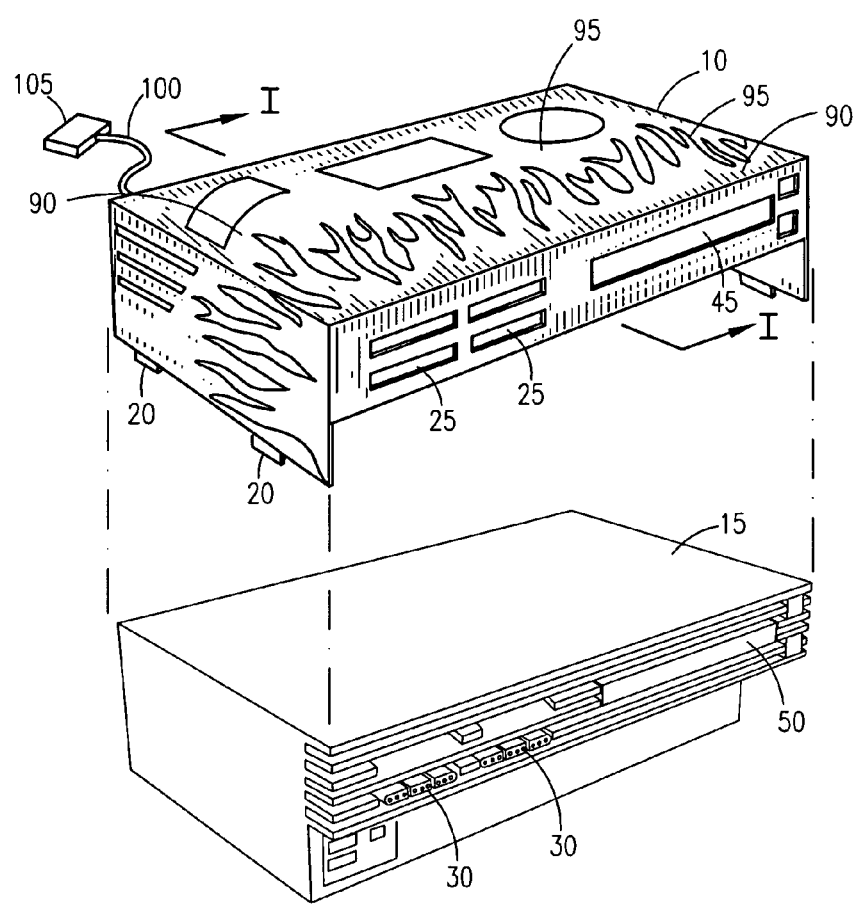
FIG. 2 is an exploded isometric view of the video game system auxiliary cover system 10 and the video game console 15.

Referring next to FIG. 2, an exploded isometric view of the video game system auxiliary cover system 10 and the video game console 15 is disclosed. This FIG. more clearly depicts the attachment method between the video game system auxiliary cover system 10 and the video game console 15 and the simple method of installation. No tools are required to remove or install the video game system auxiliary cover system 10. A simple friction fit is all that is necessary. Proper alignment of the connector openings 25 with the connectors 30 and the media tray opening 45 with the media tray 50 along with all other openings is assured dependent on the make and model of the video game console 15. It is envisioned that in addition for providing customization of the video game console 15, the video game system auxiliary cover system 10 can also be used to provide physical protection as well against dirt, dust, scratches and the like. Additionally, the user can apply stickers and other graphic images to the video game system auxiliary cover system 10 in lieu of the video game console 15, thus not reducing the value and subsequent resale value of the video game console 15. Finally, should an existing video game console 15 be damaged, scratched or cracked, the user can install the video game system auxiliary cover system 10 to provide a like new appearance. This FIG. also provides a different type of first graphic displays 70, such as fireworks. It is also envisioned that this type of first graphic displays 70 would utilize integral fiber optic strands 90 to produce display points 95 of light. The light would be produced by light-emitting diodes (LED's) as will be described in greater detail herein below. Electrical power for the LED's will be provided by a power pigtail cable 100 which would connect to the power input point of the power cable 55 (as shown in FIG. 1). In such a manner, the top surface of the video game system auxiliary cover system 10 will light up in a dark room with a multi-colored display, thus making playing video games at night or in low-light conditions an exciting event.

Figure 3:
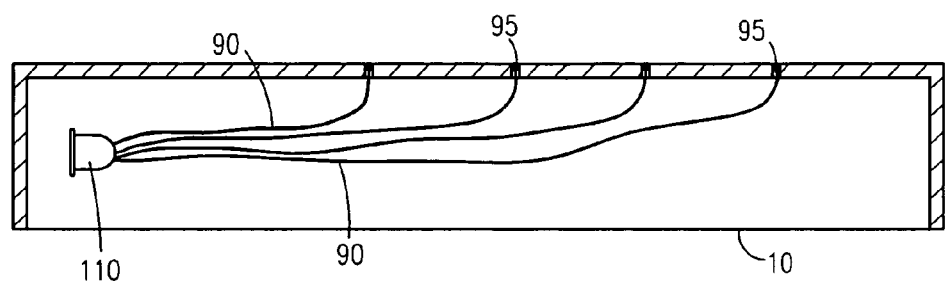
FIG. 3 is a sectional view of the video game system auxiliary cover system 10 as seen along a line I—I shown in FIG. 2; and, FIG. 4 is an exploded isometric view of a game controller cover system 115 as used with a game controller 120.

Referring now to FIG. 3, a sectional view of the video game system auxiliary cover system 10 as seen along a line I—I shown in FIG. 2 is disclosed. A light emitting diode (LED) 110 is embedded in the top surface of the video game system auxiliary cover system 10 (and/or the game controller cover 115) The long life nature of the video game system auxiliary cover system 10, coupled with their low heat dissipation and small size allow them to be sealed within the plastic structure of the video game system auxiliary cover system 10 without need for replacement. A set of multiple strands from the fiber optic strands 90 is aligned with the video game system auxiliary cover system 10 and similarly embedded within the top surface of the video game system auxiliary cover system 10. The fiber optic strands 90 are then routed outward and spread out where they turn upwards and penetrate the top surface of the video game system auxiliary cover system 10. It is envisioned that multiple light emitting diode (LED) 110 of different colors such as red, green, white, yellow, and blue could be used with overlapping and intertwined fiber optic strands 90 to produce words, pictures and the like.

Figure 4:
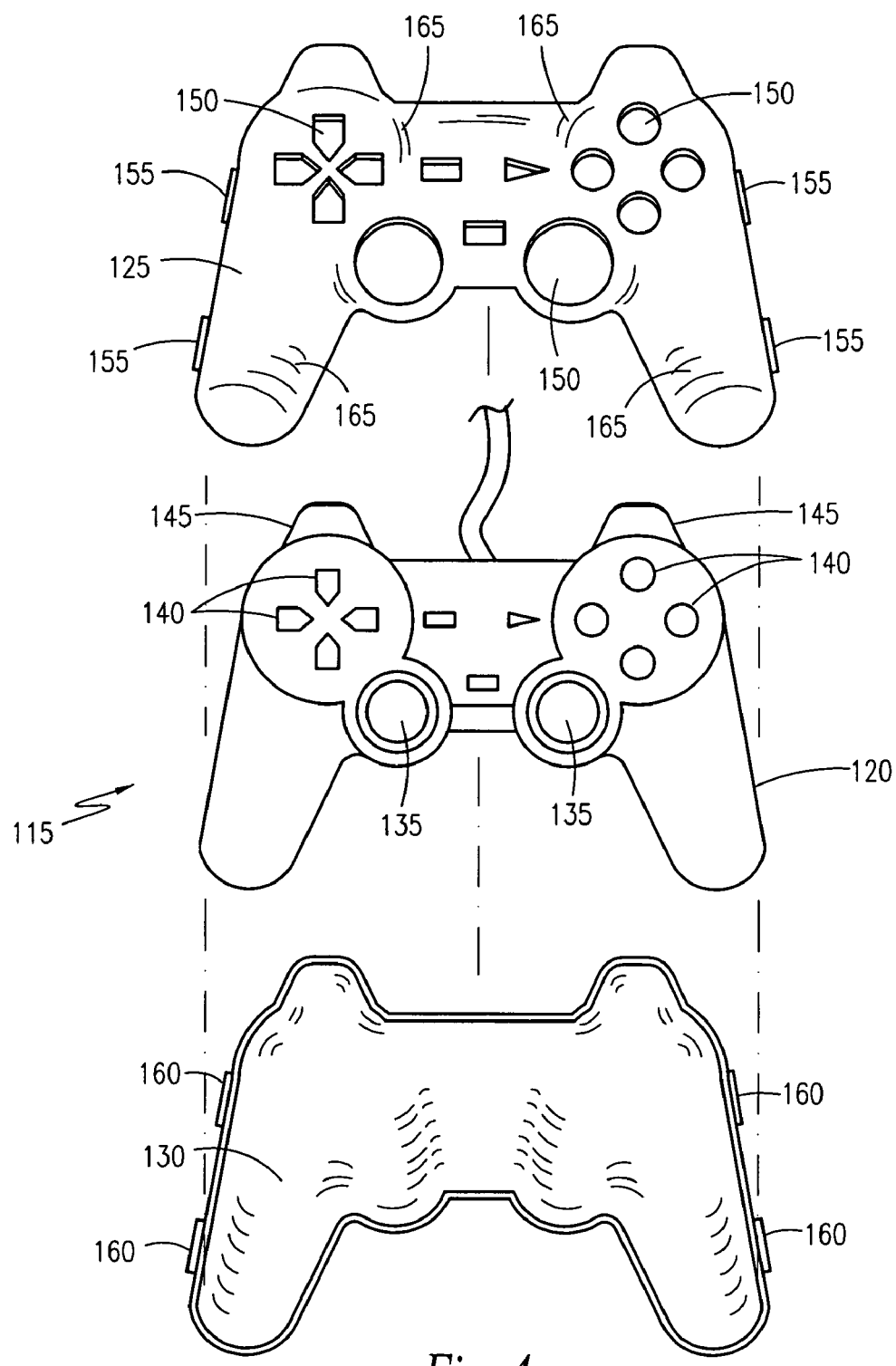

Referring finally to FIG. 4, an exploded isometric view of a game controller cover system 115 as used with a game controller 120 is disclosed. The game controller cover system 115 consists of a game controller top half 125 and a game controller bottom half 130 as shown. The game controller 120 is intended to be a generic representation of any one of the multitude of manufacturers as aforementioned described. The game controller 120 is provided with a multitude of joysticks 135, pushbuttons 140, and paddle switches 145 as commonly expected. The game controller top half 125 is then provided with a multitude of openings 150 that match abovementioned protrusions. The game controller top half 125 is provided with a set of second snap clips 155 that align with a matching set of receiving clips 160 on the game controller bottom half 130. The game controller bottom half 130 provides a basically concave form to encompass the bottom of the game controller 120. A set of second graphic displays 165 on the game controller top half 125 would match the first graphic displays 70 on the video game system auxiliary cover system 10 (as shown in FIG. 1 and FIG. 2). The game controller top half 125 and the game controller bottom half 130 can be applied and removed by hand without the use of tools or excessive force. In a manner similar to the video game system auxiliary cover system 10 (as shown in FIG. 1), the game controller cover system 115 provides physical protection for the game controller 120 or can cover surface or cosmetic damage that may be existing on the game controller 120. It is further envisioned that the game controller cover system 115 includes a plurality of LEDs or a plurality of fiber optic strands are embedded in the system 115 to provide additional aesthetic lighting to the system 115, either standing apart from the LEDs or fiber optic strands of the cover system 10 or as a compliment to the cover system 10, thus providing a lighted visual effect. The LED or fiber optic arrangement or configuration may be similar to the that disclosed in relation to the cover system 10, or may include an arrangement different to accommodate the remoteness of the controller from the console itself.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. After purchase or procurement of the video game system auxiliary cover system 10 it must be applied to the video game console 15 and corresponding game controller 120. To begin the installation process, the user would unplug all power cable 55, all monitor cable 60, all controller cables, and any other device which may protrude from the video game console 15. Next, the video game system auxiliary cover system 10 is simply slid over the video game console 15 and attached to the base of the video game console 15 by use of the first snap clips 20. In a similar manner, the game controller top half 125 and the game controller bottom half 130 are snapped around the game controller 120 and secured using the second snap clips 155 in the receiving clips 160. Next, any power cable 55, any monitor cable 60, any controller cables, and any other device that was aforementioned removed, must be reinstalled. If the video game system auxiliary cover system 10 should be equipped with a light emitting diode (LED) 110 and fiber optic strands 90, the user would connect the pass through power connector 105 of the power pigtail cable 100 to the power cable 55 before it connects to the video game console 15. At this point the video game system auxiliary cover system 10 is ready for use.

During the actual use of the video game console 15 equipped with the video game system auxiliary cover system 10, nothing is readily different nor is the actual game playing activity modified. However, the additional aesthetic value provided by the video game system auxiliary cover system 10 coupled with the internal lighting afforded by the fiber optic strands 90 and the light emitting diode (LED) 110, if so equipped, will provide additional entertainment value. If the user wishes to remove the video game system auxiliary cover system 10 for the purposes of applying a different one, or applying to a new video game console 15, or if selling the video game console 15, it can be removed easily be snapping it off.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. An auxiliary cover system for a video game console and game controller comprising:
    a video game console cover placed over said console, wherein said console cover has a plurality of fiber optic strands embedded in a top surface thereof for providing a lighted visual effect.

2. The auxiliary cover system of claim 1, wherein said video game console cover comprises:
    a top half having a plurality of openings corresponding to joysticks, pushbuttons and paddle switches provided on said game controller; and
    a bottom half having a form complementary to a bottom half of said game controller;
    said top half and said bottom half coupled via snap clips.

3. The auxiliary cover system of claim 2, wherein said video game console cover has a display provided on a top surface thereof.

4. The auxiliary cover system of claim 1, wherein said console cover comprises:
    a pair of connector openings to permit egress of connectors;
    a pair of switch openings to permit access to switches; and
    a media tray opening to permit access to a media tray.

5. The auxiliary cover system of claim 4, wherein said console cover further comprises a plurality of openings for cables.

6. The auxiliary cover system of claim 5, wherein said console cover further comprises a plurality of vent openings corresponding to vents on said console, thereby discharging heated air to outside ambient air.

7. The auxiliary cover system of claim 1, wherein said console cover has a first graphic display provided on a top surface thereof.

8. The auxiliary cover system of claim 7, wherein said first graphic display is a member selected from the group consisting of sports themes, children's themes, adult themes and fantasy themes.

9. The auxiliary cover system of claim 7, wherein said console cover further comprises furnished graphic images.

10. The auxiliary cover system of claim 7, wherein said console cover further comprises user supplied images.

* * * * *